(12) United States Patent
Morrison et al.

(10) Patent No.: US 9,094,103 B2
(45) Date of Patent: **\*Jul. 28, 2015**

(54) BROADBAND DISTRIBUTED ANTENNA SYSTEM WITH NON-DUPLEXER ISOLATOR SUB-SYSTEM

(71) Applicant: ANDREW LLC, Hickory, NC (US)

(72) Inventors: Charles B. Morrison, Forest, VA (US);
Donald R. McAllister, Lynchburg, VA (US); Fred W. Phillips, Forest, VA (US); Christopher G. Ranson, Concord, VA (US); Van E. Hanson, Forest, VA (US); Thomas Kummetz, Kissing (DE); Gregory Allan Maca, Lynchburg, VA (US)

(73) Assignee: COMMSCOPE TECHNOLOGIES LLC, Hickory, NC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/444,804

(22) Filed: Jul. 28, 2014

(65) Prior Publication Data

US 2014/0335799 A1 Nov. 13, 2014

Related U.S. Application Data

(63) Continuation of application No. 13/484,700, filed on May 31, 2012, now Pat. No. 8,818,299.

(60) Provisional application No. 61/492,077, filed on Jun. 1, 2011.

(51) Int. Cl.
*H04B 1/44* (2006.01)
*H04B 1/525* (2015.01)
(Continued)

(52) U.S. Cl.
CPC ............. *H04B 1/44* (2013.01); *H01Q 1/246* (2013.01); *H01Q 1/525* (2013.01); *H04B 1/525* (2013.01); *H04B 10/25754* (2013.01)

(58) Field of Classification Search
CPC .... H04B 1/525; H04B 10/25754; H04B 1/48; H04B 1/44; H04B 1/18; H04B 1/406; H04B 1/40; H04B 1/54; H01Q 1/525; H01Q 1/246
USPC .......... 455/78, 79, 234.1, 240.1, 550.1, 552.1, 455/561, 562.1, 77
See application file for complete search history.

(56) References Cited

U.S. PATENT DOCUMENTS 5,691,978 A 11/1997 Kenworthy
6,169,912 B1 1/2001 Zuckerman
(Continued)

FOREIGN PATENT DOCUMENTS

WO 2010092166 A2 8/2010

OTHER PUBLICATIONS

Martone, "A Blind Adaptive QR-Based Lattice Multi-Channel Filter for Cellular Base-Station TDMA Transceivers with Anntenna Arrays", IEEE, 1997, pp. 147-151.
(Continued)

*Primary Examiner* — Nhan Le
(74) *Attorney, Agent, or Firm* — Kilpatrick Townsend & Stockton LLP

(57) ABSTRACT

Certain aspects and aspects of the present invention are directed to a distributed antenna system having a downlink communication path, an uplink communication path, and a non-duplexer isolator sub-system. The downlink communication path can communicatively couple a transmit antenna to a base station. The uplink communication path can communicatively couple a receive antenna to the base station. In one aspect, the non-duplexer isolator sub-system can be electronically configured for isolating uplink signals traversing the uplink communication path from downlink signals. In another aspect, a non-duplexer isolator sub-system can be configurable in one or more mechanical steps selecting a frequency response. In another aspect, a non-duplexer isolator sub-system can include an active mitigation sub-system.

19 Claims, 12 Drawing Sheets

(51) Int. Cl.
*H01Q 1/24* (2006.01)
*H01Q 1/52* (2006.01)
*H04B 10/2575* (2013.01)

(56) References Cited

U.S. PATENT DOCUMENTS

| | | | |
|---|---|---|---|
| 6,640,111 | B1 | 10/2003 | Shapira |
| 6,704,349 | B1 | 3/2004 | Masenten |
| 6,745,003 | B1 | 6/2004 | Maca et al. |
| 6,993,287 | B2 | 1/2006 | O'Neill |
| 7,443,829 | B2 | 10/2008 | Rizvi et al. |
| 7,555,261 | B2 | 6/2009 | O'Neill |
| 7,605,755 | B2 | 10/2009 | Van Rooyen et al. |
| 7,623,571 | B2 | 11/2009 | Petré et al. |
| 7,783,318 | B2 | 8/2010 | Wilson et al. |
| 7,809,047 | B2 | 10/2010 | Kummetz |
| 8,305,941 | B2 * | 11/2012 | Cohen et al. ............ 370/278 |
| 8,818,299 | B2 * | 8/2014 | Morrison et al. ........... 455/78 |
| 2004/0266338 | A1 * | 12/2004 | Rowitch ........................ 455/7 |
| 2006/0205342 | A1 | 9/2006 | McKay et al. |
| 2007/0049213 | A1 | 3/2007 | Tran |
| 2009/0041094 | A1 | 2/2009 | Ishii |
| 2009/0061940 | A1 | 3/2009 | Scheinert et al. |
| 2009/0075644 | A1 | 3/2009 | Hermel |
| 2009/0207896 | A1 | 8/2009 | Behzad |
| 2009/0232510 | A1 | 9/2009 | Gupta et al. |
| 2009/0238573 | A1 | 9/2009 | Bauman |
| 2009/0290632 | A1 | 11/2009 | Wegener |
| 2010/0105340 | A1 | 4/2010 | Weissman |
| 2010/0118921 | A1 | 5/2010 | Abdelmonem et al. |
| 2010/0166109 | A1 | 7/2010 | Neumann et al. |
| 2010/0197231 | A1 | 8/2010 | Kenington |
| 2010/0261504 | A1 | 10/2010 | Lukkarila |
| 2010/0278530 | A1 | 11/2010 | Kummetz et al. |
| 2010/0317386 | A1 | 12/2010 | Da Silva et al. |
| 2011/0013686 | A1 | 1/2011 | Malladi et al. |
| 2011/0051790 | A1 | 3/2011 | Honda |
| 2012/0052892 | A1 | 3/2012 | Braithwaite |
| 2012/0329523 | A1 | 12/2012 | Stewart et al. |

OTHER PUBLICATIONS

Yamada et al., "RF Filter Technologies for W-CDMA Mobile Telecommunication System", Matsushita Technical Journal, vol. 47, No. 6, Dec. 2001, pp. 88-92 (Translation of Abstract Only—1 page).
Van Berkel et al., "Vector Processing as an Enabler for Software-Defined Radio in Handsets from 3G+WLAN Onwards", Proceeding of the SDR 04 Technical Conference and Product Exposition (http://datamemberclicks.com/site/sdf/sdr04-2.4-1%20Van%20Berkel.pdf), 2004, 6 pages.
International Patent Application No. PCT/US2012/040265, International Search Report and Written Opinion mailed Sep. 11, 2012, 13 pages.
U.S. Appl. No. 13/484,700, Non-Final Office Action mailed Jan. 15, 2014, 10 pages.
U.S. Appl. No. 13/484,700, Notice of Allowance mailed Apr. 25, 2014, 7 pages.
Chinese Patent Application No. CN201280034216.9, Chinese First Office Action mailed Jan. 22, 2015, 12 pages.

* cited by examiner

BROADBAND DISTRIBUTED ANTENNA SYSTEM WITH NON-DUPLEXER ISOLATOR SUB-SYSTEM

RELATED APPLICATIONS

This is a continuation of U.S. patent application Ser. No. 13/484,700 filed May 31, 2012 titled "Broadband Distributed Antenna System With Non-Duplexer Isolator Sub-System," which claims the benefit of U.S. Provisional Application Ser. No. 61/492,077 filed Jun. 1, 2011 titled "Broadband Distributed Antenna System With Non-Duplexer Isolator Sub-System," the contents of both of which are hereby incorporated by reference.

TECHNICAL FIELD

The present invention relates generally to telecommunications and, more particularly (although not necessarily exclusively), to isolating an uplink communication path from a downlink communication path in a distributed antenna system using a non-duplexer isolator sub-system.

BACKGROUND

A distributed antenna system ("DAS") can be used to extend the coverage of a cellular communication system. For example, a DAS can extend coverage to areas of traditionally low signal coverage within buildings, tunnels, or in areas obstructed by terrain features.

A DAS can include one or more master units in communication with carrier systems, such as base transceiver stations of cellular service providers. The DAS can also include remote antenna units physically separated from the master unit, but in communication with the master unit via a serial link that may be copper, optical, or other suitable communication medium. The remote antenna units can wirelessly communicate with user devices positioned in a coverage area.

For example, the remote antenna units can be positioned in a building, tunnel, or other structure that prevents or limits communications directly with the carriers. Remote antenna units amplify downlink signals received from the base station via a master unit and radiate the downlink signal using an antenna. An antenna unit recovers uplink signals from mobile user equipment and provides the uplink signals to the master unit. The uplink signals are summed together and provided back to the base station.

A remote antenna unit typically includes at least one duplexer for separating uplink signals and downlink signals. Duplexers isolate a transmitter output from a receiver input by allowing frequencies within the downlink band to be provided from the transmitter output to the antenna and allowing frequencies within the uplink band to be provided from the antenna output to the receiver. Isolating a transmitter output from a receiver input prevents downlink signals from interfering with uplink signals. Isolating a transmitter output from a receiver input also prevents the receiver from recovering transmitter-generated noise that would desensitize the receiver.

Duplexers, however, are undesirable for a variety of reasons. Duplexers use fixed filters tuned to the specific frequencies. A DAS covers a wide range of frequencies for flexibility and cost reduction reasons. The allocation of these frequencies into bands may change over time and are typically different in different countries. Re-tuning a duplexer involves a multi-step tuning procedure to change the position of a multitude of tuning screws. Re-tuning a ceramic duplexer may involve the use of a hand tool to re-shape the duplexer. The manual configurations use a network analyzer to identify the resulting change in the operation of the duplexer. Duplexers using fixed filters provide little or no flexibility to respond to changes in frequency band allocation.

One solution for isolating uplink signals from downlink signals without a duplexer is an RF-impermeable layer separating transmit and receive antennas. This solution is generally sufficient to prevent transmitter-generated noise from desensitizing the receiver, but additional isolation implemented with or without the RF impermeable layer may be desired. Therefore, systems and methods are desirable that provide additional signal isolation without the use of a duplexer.

SUMMARY

One aspect of the present invention is directed to a distributed antenna system having a downlink communication path, an uplink communication path, and a non-duplexer isolator sub-system. The downlink communication path can communicatively couple a transmit antenna to a base station. The uplink communication path can communicatively couple a receive antenna to the base station. The non-duplexer isolator sub-system can be electronically configured for isolating uplink signals traversing the uplink communication path from downlink signals.

Another aspect is directed to a distributed antenna system having a downlink communication path, an uplink communication path, and a non-duplexer isolator sub-system. The downlink communication path can communicatively couple a transmit antenna to a base station. The uplink communication path can communicatively couple a receive antenna to the base station. The non-duplexer isolator sub-system can include a filter device configurable in one or more mechanical steps selecting a frequency response.

Another aspect is directed to a distributed antenna system having a downlink communication path, an uplink communication path, and a non-duplexer isolator sub-system. The downlink communication path can communicatively couple a transmit antenna to a base station. The uplink communication path can communicatively couple a receive antenna to the base station. The non-duplexer isolator sub-system can include an active mitigation sub-system These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and features of the present invention are directed to a non-duplexer isolator sub-system for a DAS. A non-duplexer isolator sub-system according to some aspects can isolate uplink signals traversing an uplink communication path in the system from downlink signals and derivatives thereof, obviating the need for a duplexer in the DAS.

In some aspects, the non-duplexer isolator sub-system may include one or more configurable filters. The configurable filters may be positioned in one or both of a downlink communication path or an uplink communication path. The configurable filters can reject or attenuate spurious signals that may leak into, or otherwise be present in, the uplink communication path. In some aspects, the configurable filters are configured via one or more mechanical steps selecting a frequency response for the respective filters. In other aspects, the configurable filters are configured electronically by a control signal.

In one aspect, the non-duplexer isolator sub-system includes circuitry capable of performing active mitigation of undesirable signals. Mitigating an undesirable signal can include cancelling the undesirable signal or otherwise minimizing the undesirable signal. The circuitry can include a filter that can adjust the gain and shift the phase of a downlink reference signal to generate a mitigation signal. The mitigation signal can be summed with the uplink signal to mitigate undesirable signal components included in the uplink signal. Analog or digital filters can be used to generate the mitigation signal. In some aspects, the analog or digital filters are adaptive filters that can adjust a frequency response dynamically. In other aspects, the analog or digital filters are non-adaptive filters that are configured to have a static frequency response that may be configured manually.

Detailed descriptions of these aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects but, like the illustrative aspects, should not be used to limit the present invention.

Figure 1:
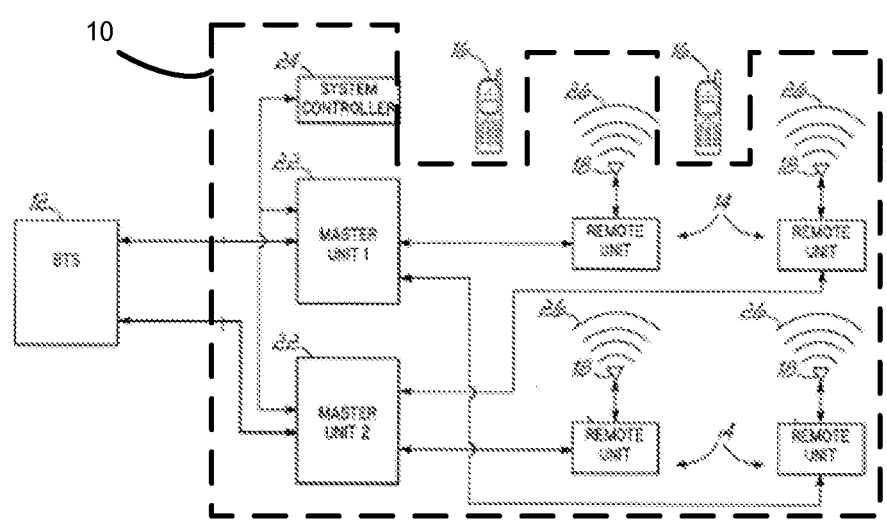
FIG. 1 is a schematic view of a distributed antenna system in which a non-duplexer isolator sub-system can be disposed according to one aspect.

FIG. 1 schematically depicts a DAS 10 in which a non-duplexer isolator sub-system can be disposed according to one aspect. The DAS 10 can be communicatively coupled to at least one base station 12 via a wired or wireless communication medium. The DAS 10 can be positioned in an area such as a building environment to extend wireless communication coverage. The DAS 10 can include one or more remote antenna units 14 that are distributed in the environment to provide coverage within a service area of the DAS 10. The remote antenna units 14 can service a number of different user devices 16, such as cellular phones, operating in the environment of the DAS 10. Each remote antenna unit 14 can include at least one antenna 18. Antenna 18 may include one or more antenna elements.

Remote antenna units 14 can be communicatively coupled to one or more master units 22 via any communication medium capable of carrying signals between the master unit 22 and remote antenna unit 14. Examples of a suitable communication medium can include (but are not limited to) copper, optical, and microwave link. Master units 22 can process the signals from remote antenna units 14 to interface appropriately with the base station 12. A system controller 24 can control the operation of each of the master units 22 for processing the signals 26 associated with the remote antenna units 14. The signals 26 of the remote antenna units 14 may be the uplink and downlink signals of the DAS 10 for communicating with user devices 16.

Although the DAS 10 is depicted as including two master units 22 and four remote antenna units 14, any number (including one) of each of master units 22 and remote antenna units 14 can be used. Furthermore, a DAS 10, according to some aspects, can be implemented without system controller 24.

Figure 2:
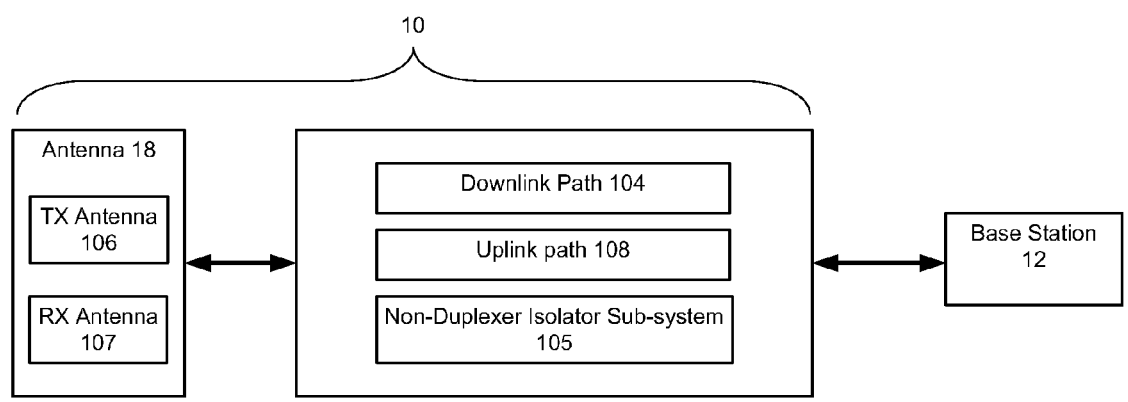
FIG. 2 is a block diagram of a non-duplexer isolator sub-system disposed in the distributed antenna system of FIG. 1 according to one aspect.

FIG. 2 depicts a non-duplexer isolator sub-system 105 disposed in the DAS 10 that eliminates the need for a duplexer. The DAS 10 in FIG. 2 also includes a downlink communication path 104 and an uplink communication path 108. The non-duplexer isolator sub-system 105 can isolate signals traversing the uplink communication path 108 from signals or other signal components of the downlink communication path 104.

The downlink communication path 104 and the uplink communication path 108 can be communicatively coupled to the antenna 18. In some aspects, the antenna 18 includes two antennas: a transmit antenna 106 and a receive antenna 107. In other aspects, the antenna 18 includes one antenna that can both transmit and receive RF signals. The transmit antenna 106 can radiate RF signals having information from the base station 12 to the user devices 16. The receive antenna 107 can recover signals from user devices 16 to be provided to base station 12.

In some aspects, non-duplexer isolator sub-system 105 is disposed in a remote antenna unit 14. In other aspects, non-duplexer isolator sub-system 105 is disposed in a master unit 22. The non-duplexer isolator sub-system 105 may alternatively be disposed partially within a master unit 22 and partially within a remote antenna unit 14.

The non-duplexer isolator sub-system 105 according to various aspects may be any non-duplexer device or collection of components. The non-duplexer isolator sub-system 105 may also incorporate components that prevent the formation of a feedback loop. These components, described in further detail below, can attenuate the gain of both uplink and downlink signal to prevent system instability in the DAS 10. Certain features of a suitable non-duplexer isolator sub-system are described below.

Mechanically Configurable Filter

Figure 3:
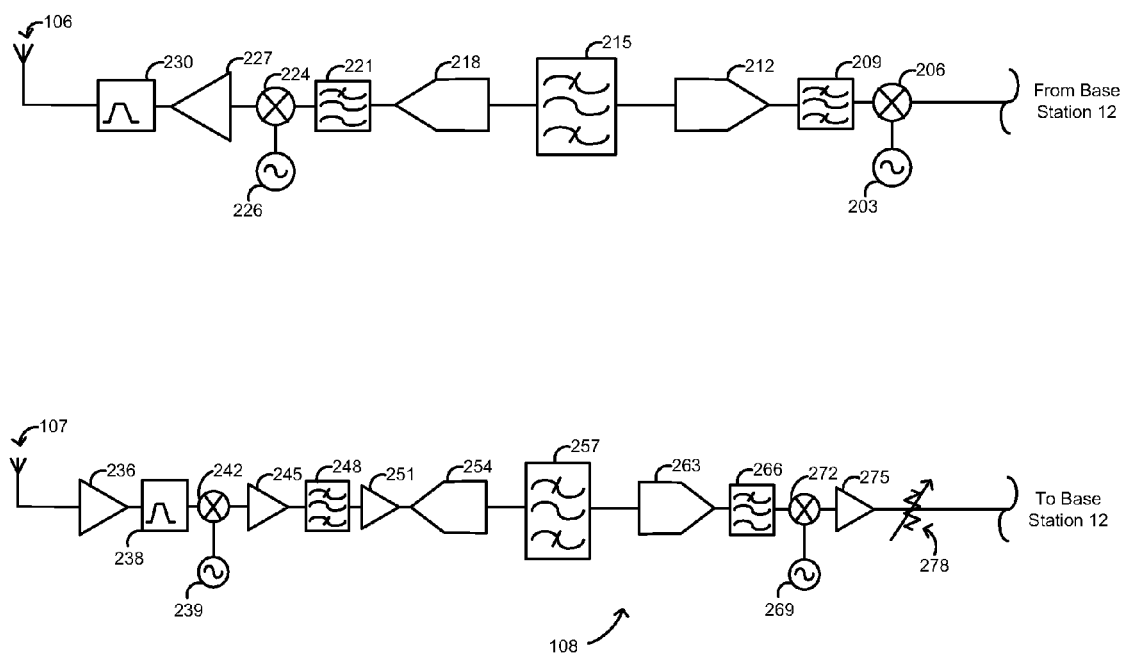
FIG. 3 is a schematic view of a non-duplexer isolator sub-system that includes filter devices configured via one or more mechanical steps according to one aspect.

FIG. 3 schematically depicts a non-duplexer isolator sub-system that includes a filter device configured via one or more mechanical steps according to one aspect. The non-duplexer isolator sub-system in FIG. 3 includes both a mechanically configurable filter 230 in the downlink communication path 104 and a mechanically configurable filter 238 in the uplink communication path 108. In other aspects, the mechanically configurable filter includes a mechanically configurable filter in only one of the downlink communication path 104 or the uplink communication path 108.

The DAS 10 includes the downlink communication path 104 and the uplink communication path 108 communicatively coupled to the base station 12. Downlink signals are provided from base station 12 to the downlink communication path 104. Transmit antenna 106 can radiate downlink signals traversing the downlink communication path 104 to the user devices 16. Receive antenna 107 can recover uplink signals from user devices 16 and can provide the uplink signals to the uplink communication path 108. Signals traversing uplink communication path 108 are provided to base station 12.

In some aspects, the DAS 10 may include a splitter-combiner that can connect downlink communication path 104 and uplink communication path 108 to a common port communicatively coupled to base station 12. The splitter-combiner can receive signals from base station 12 and split downlink signals to be transmitted from the uplink signals to be provided to the base station 12. The splitter-combiner can provide downlink signals to downlink communication path 104. The splitter-combiner can provide uplink signals to base station 12.

FIG. 3 also depicts components that may be included in the downlink communication path 104 and components that may be included in the uplink communication path 108. The downlink communication path 104 can include a local oscillator 203, a mixer 206, an anti-aliasing filter 209, an analog-to-digital converter 212, a digital IF filter 215, a digital-to-analog converter 218, an analog filter 221, a mixer 224, a local oscillator 226, a power amplifier 227, and a mechanically configurable filter 230.

The mixer 206 and the local oscillator 203 can down-convert the downlink signal received from the base station 12 from RF to an intermediate frequency ("IF").

The anti-aliasing filter 209 can reduce aliasing from converting the downlink signal from analog to digital. For example, the anti-aliasing filter 209 can reject signal components at frequencies greater than one-half the sampling frequency of analog-to-digital converter 212. The anti-aliasing filter 209 can also reject signal components in one or more adjacent Nyquist zones. In some aspects, the anti-aliasing filter 209 can be a surface acoustic wave ("SAW") filter. The analog-to-digital converter 212 can convert the analog downlink signal to a digital downlink signal for communication via a serial link between a master unit, which includes the analog-to-digital converter 212, and a remote unit. The digital IF filter 215 can receive the digital downlink signal and reduce the gain of the downlink digital signal.

The digital-to-analog converter 218 can convert the downlink signal to an analog signal. The analog filter 221 can receive the analog downlink signal and remove any aliases resulting from converting the digital signals to analog. The mixer 224 and the local oscillator 226 can up-convert the downlink signal to the appropriate RF frequency. The power amplifier 227 can amplify the downlink signal to the output power for transmission.

Prior to the transmit antenna 106 broadcasting the downlink signal, mechanically configurable filter 230 can filter the downlink signal to isolate receive antenna 107 from undesirable signal components. Undesirable signal components may be generated by components of the downlink communication path 104 while processing the downlink signal, or otherwise. Undesirable signal components may include signals, other than the desired downlink signal, transmitted by transmit antenna 106 at a frequency within the frequency band of receive antenna 107. Undesirable signal components may also include harmonics of the transmit RF frequency of downlink signals.

Undesirable signal components may also include signals generated by the mixer 224 and the local oscillator 226 during up-conversion to RF. For example, during up-conversion, the mixer 224 can process the IF downlink signal and a signal received from the local oscillator 226. The output signal of the mixer 224 can include two signals. One signal may be the RF downlink signal at a frequency equal to the sum of the frequencies of the IF downlink signal and the signal received from local oscillator 226. The other signal may be an image signal at a frequency equal to the difference of the frequencies of the IF downlink signal and the signal received from local oscillator 226. The image signal, as well as any harmonics of the output signals of mixer 224, may be undesirable signal components.

The mechanically configurable filter 230 may be any suitable filter device that can be configured in one or more mechanical steps selecting a frequency response. A mechanical step can be a physical step, such as (but not limited to) moving a switch between positions. In some aspects, a mechanical step can be executed by one or more devices in response to a control signal provided to the mechanically configurable filter. In other aspects, a mechanical step can be executed by an operator.

The mechanically configurable filter 230 may include a bandpass filter that passes the desired frequency band of the downlink signals. The bandpass filter can reject or attenuate undesirable signal components. By rejecting or attenuating undesirable signal components that may be transmitted at frequencies to which receive antenna 107 may be tuned, the mechanically configurable filter 230 can isolate uplink communication path 108 from downlink communication path 104.

The desired downlink frequency band of mechanically configurable filter 230 can be manually selected in a single physical step. A single physical step may include using an RF switch to select a channel corresponding to a particular frequency band on a multi-channel switch filter bank.

In some aspects, some components of downlink communication path 104 may be disposed in master unit and other components may be disposed within a remote antenna unit. The components disposed in a master unit can include a local oscillator 203, a mixer 206, an anti-aliasing filter 209, and an analog-to-digital converter 212. The components disposed within a remote antenna unit can include a digital IF filter 215, a digital-to-analog converter 218, an analog filter 221, a mixer 224, a local oscillator 226, a power amplifier 227, and a mechanically configurable filter 230. In these aspects, the output of the analog-to-digital converter 212 is coupled to the input of the digital IF filter 215 via a serial communications link.

In other aspects, all components of downlink communication path 104 may be disposed in a master unit or in a remote antenna unit. Although FIG. 3 depicts the downlink communication path 104 receiving signals directly from the base station 12, a downlink communication path 104 may receive signals from a base station 12 via one or more intermediate components or devices. For example, if all components of a downlink communication path 104 are disposed in a remote antenna unit, the downlink communication path 104 can receive signals from a base station 12 via a master unit.

The uplink communication path 108 can include a low noise amplifier 236, a mechanically configurable filter 238, a local oscillator 239, a mixer 242, an amplifier 245, an anti-aliasing filter 248, an amplifier 251, an analog-to-digital converter 254, a digital IF filter 257, a digital-to-analog converter 263, an analog filter 266, a local oscillator 269, a mixer 272, a power amplifier 275, and an uplink gain adjust device 278.

The receive antenna 107 can recover uplink signals from a mobile user device and provide uplink signals to the low noise amplifier 236. The low noise amplifier 236 can amplify uplink signals recovered by the receive antenna 107.

A mechanically configurable filter 238 can filter the uplink signal to reject undesirable signal components. Undesirable signal components may include signals, other than the desired uplink signal, such as those described previously, which can include harmonics of the transmitted downlink signal and image signals and harmonics from the mixer 224 and the local oscillator 226.

A mechanically configurable filter 238 may include a bandpass filter that can pass a desired uplink frequency band. The bandpass filter can reject or attenuate undesirable signal components at frequencies outside the desired uplink frequency band. By filtering the uplink signals, mechanically configurable filter 238 can isolate the uplink communication path 108 from downlink communication path 104.

The uplink signal can be further processed by local oscillator 239 and mixer 242 to down-convert the uplink signal from RF to IF. The amplifier 245 can amplify the down-converted uplink signal. The anti-aliasing filter 248 can reject signal components at frequencies greater than one-half the sampling frequency of analog-to-digital converter 254, as well as frequencies within one or more adjacent Nyquist zones, to reduce aliasing from converting the uplink signal from analog to digital. In some aspects, the anti-aliasing filter 248 may be a SAW filter. The amplifier 251 can amplify the uplink signal. Analog-to-digital converter 254 can convert the analog uplink signal to a digital uplink signal that may be transmitted over a serial link from a remote unit to a master unit. The digital IF filter 257 can further limit the gain of the uplink signal.

The digital-to-analog converter 263 can convert the uplink digital signal to an analog signal. The analog filter 266 can filter the signal to prevent aliasing that may result from converting the digital signals to analog. The local oscillator 269 and the mixer 272 can up-convert the uplink signal to RF for transmission to the base station 12. The power amplifier 275 can amplify the uplink signal prior to transmission to the base station 12.

The uplink gain adjust device 278 can compensate for transmitter noise on the uplink signal. For example, the uplink gain adjust device 278 can increase the uplink signal gain to prevent that the signal-to-noise ratio of the uplink signal from decreasing below an acceptable threshold. The uplink signal from gain adjust device 278 can be provided to the base station 12.

In some aspects, some components of the uplink communication path 108 are disposed in a master unit and other components of uplink communication path 108 are disposed in a remote antenna unit. The components disposed in a remote antenna unit may include the low noise amplifier 236, the mechanically configurable filter 238, the local oscillator 239, the mixer 242, the amplifier 245, the anti-aliasing filter 248, the amplifier 251, and the analog-to-digital converter 254. The components disposed in a master unit may include the digital IF filter 257, the digital-to-analog converter 263, the analog filter 266, the local oscillator 269, the mixer 272, the power amplifier 275, and the uplink gain adjust device 278. The analog-to-digital converter 254 can be serially coupled to the digital IF filter 257.

Although FIG. 3 depicts the uplink communication path 108 providing signals directly to the base station 12, an uplink communication path 108 may provide signals to a base station 12 via one or more intermediate components or devices. For example, if all components of an uplink communication path 108 are disposed in a remote antenna unit, the uplink communication path 108 can provide signals to a base station 12 via a master unit.

In some aspects, the uplink communication path 108 may include a digital summer in a master unit. The digital summer can be communicatively coupled to the output of digital IF filter 257. The digital summer can sum uplink signals from various remote antenna units before providing the uplink signals to the base station 12.

Electronically Configurable Filter

Figure 4:
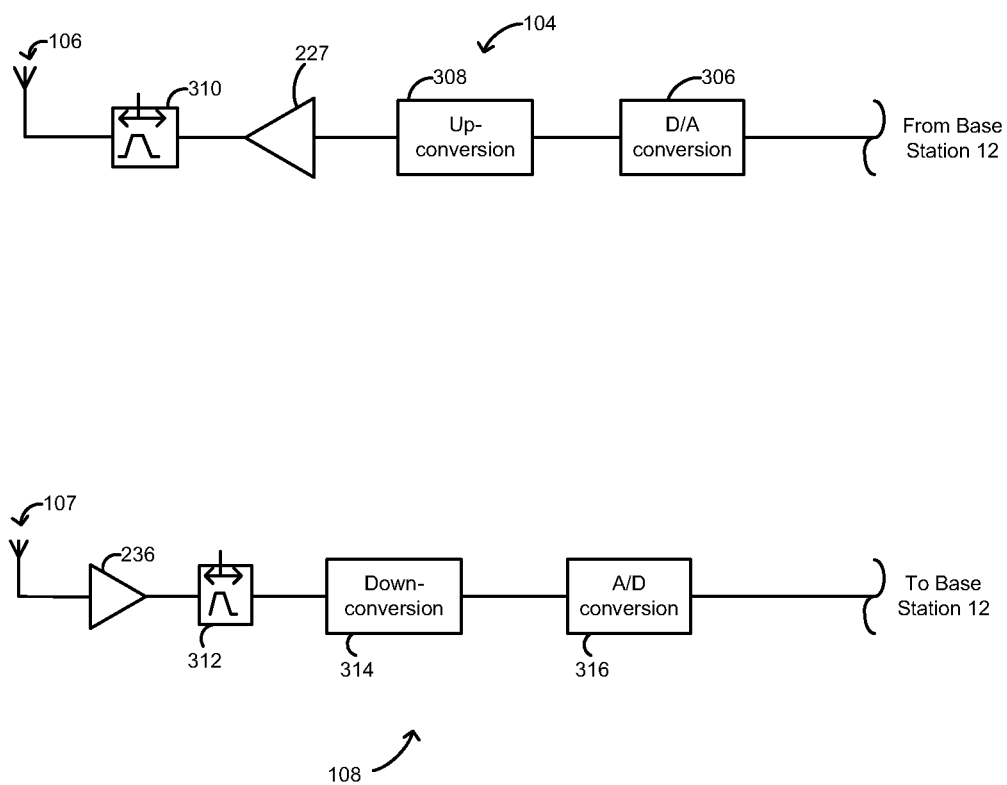
FIG. 4 is a partial schematic view of a non-duplexer isolator sub-system that includes electronically configurable filters according to one aspect.

FIG. 4 schematically depicts a non-duplexer isolator sub-system according to one aspect that includes electronically configurable filters 310, 312 disposed in the downlink communication path 104 and the uplink communication path 108, respectively. As with the mechanically configurable filters depicted in FIG. 3, a DAS 10 according to some aspects can include only one of the electronically configurable filters 310, 312 instead of both electronically configurable filters 310, 312.

FIG. 4 depicts a non-duplexer sub-system using signal processing blocks. The signal processing blocks of FIG. 4 may be implemented using components such as those as depicted in FIG. 3. Other configurations and aspects may of course be utilized.

The downlink communication path 104 can include a digital-to-analog conversion block 306 and an up-conversion block 308. The uplink communication path 108 can include a down-conversion block 314 and an analog-to-digital conversion block 316.

The electronically configurable filters 310, 312 can isolate signals traversing the uplink communication path 108 from the downlink communication path 104. The electronically configurable filters 310, 312 may be bandpass filters that can be configured electronically. The bandpass filters can remove undesirable signal components, such as transmitter-generated noise and spurious outputs of up-conversion block 308, from uplink signals by passing the desired downlink or uplink frequency band and rejecting undesirable signal components outside the desired frequency band.

The electronically configurable filters 310, 312 can be configured by modifying the frequency response in response to receiving an electronic control signal. The frequency response may include the desired frequency band to be passed. The electronic control signal may be provided by an external controller. An example of an external controller is a computing device, such as (but not limited to) a laptop or a server, that is communicatively coupled to the electronically configurable filter being configured. The electronically configurable filter can include a microprocessor or similar device that can respond to the electronic control signal by configuring the electronically configurable filter to have a desired frequency response.

In some aspects, electronically configuring the electronically configurable filters 310, 312 can include modifying the frequency response by electrically tuning the electronically configurable filters 310, 312 in response to the electronic control signal. In other aspects, electronically configuring the electronically configurable filters 310, 312 can include modifying the frequency response via one or more mechanical steps executed in response to the electronic control signal.

The electronically configurable filters 310, 312 may include any bandpass filter for which the frequency response can be adjusted in response to an electronic control signal. In some aspects, the bandpass filter includes one or more varactor diodes. The frequency response of the bandpass filter can be adjusted by varying the capacitance of one or more varactor diodes in response to the electronic control signal. The capacitance of the varactor diodes can be varied by applying varying input voltages to respective terminals of the varactor diodes. Altering the capacitance of one or more varactor diode can alter both the center frequency and bandwidth of the bandpass filter. In some aspects, the source of the applied voltage may be disposed in the electronically configurable filter, with applied voltage levels controlled by the microprocessor in response to receiving an electronic control signal from the external controller. In other aspects, the source of the applied voltage may be an external device controlled by the external controller.

Active Analog Mitigation

Figure 5:
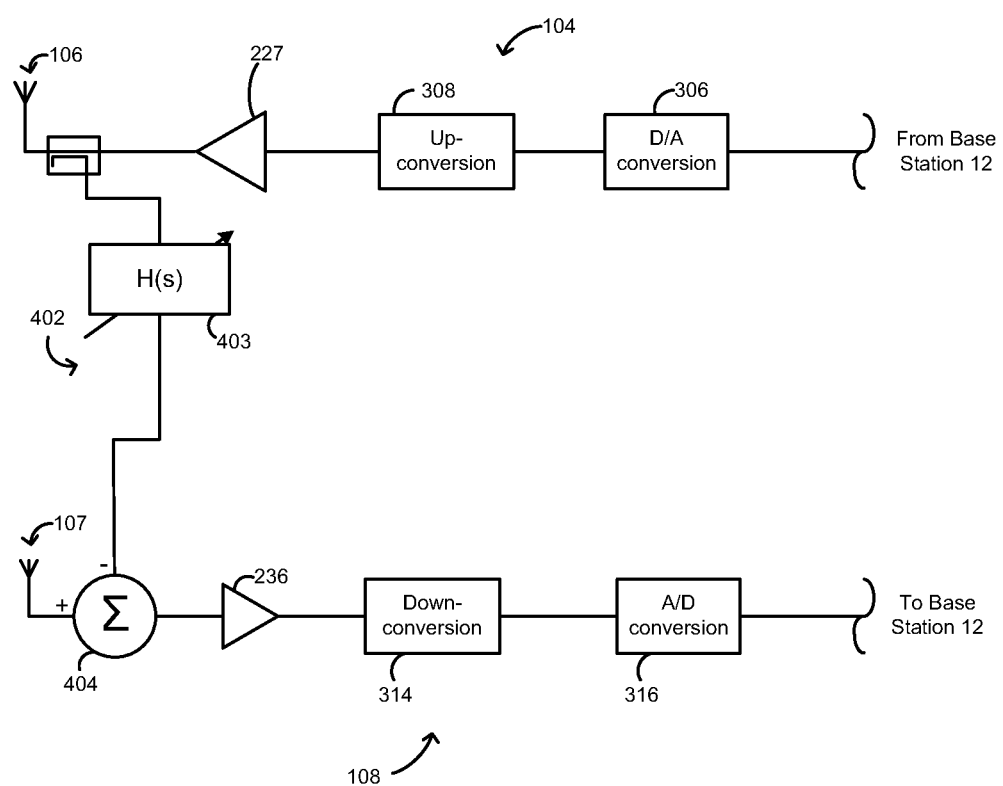
FIG. 5 is a partial schematic view of a non-duplexer isolator sub-system that includes active analog mitigation according to one aspect.

FIG. 5 schematically depicts a non-duplexer isolator subsystem that includes active analog mitigation circuitry disposed in uplink communication path 108. The active analog mitigation circuitry may include an analog summer 404 that receives a downlink mitigation signal from a configurable analog filter 403 in a reference communication path 402. The reference communication path 402 may include a path from a coupled point at the output of power amplifier 227 to an input of the analog summer 404. A downlink reference signal from the output of power amplifier 227 can traverse the reference communication path 402.

A configurable analog filter 403 can be positioned in the reference communication path 402 and communicatively coupled to the power amplifier 227 to receive the downlink reference signal. The configurable analog filter 403 can generate a downlink mitigation signal from the downlink reference signal by adjusting the gain and shifting the phase of the downlink reference signal. The downlink mitigation signal may be equal in amplitude to and 180 degrees out of phase with undesirable signal components generated in downlink communication path 104 and recovered by receive antenna 107.

An analog summer 404 can be positioned in the uplink communication path 108. The output of configurable analog filter 403 can be communicatively coupled to one of the inputs of analog summer 404. Another input of the analog summer 404 can be communicatively coupled to the receive antenna 107. The analog summer 404 can receive the downlink mitigation signal from the configurable analog filter 403 and sum the downlink mitigation signal with the uplink signal to mitigate any undesirable signal components present in the uplink signal. Mitigating undesirable signal components can include, for example, cancelling the undesirable signal components present in the uplink signal. The analog summer 404 can provide the uplink signal to the low noise amplifier 236. The uplink signal can traverse the remainder of uplink communication path 108 as depicted in FIG. 3.

The frequency response of the configurable analog filter 403 may be configured via a test signal at the configuration of the DAS 10. For example, a test signal can be transmitted by the transmit antenna 106 and any signal detected on the uplink communication path 108 can be identified as the undesirable signal component generated by the transmission of the test downlink signal. The frequency response of the configurable analog filter 403 may then be adjusted via electronic or manual processes to generate a downlink mitigation signal equal in amplitude to and 180 degrees out of phase with the undesirable signal component. In some aspects, the configurable analog filter 403 may include an analog vector modulator capable of adjusting the phase and gain of the downlink mitigation signal.

In some aspects, the configurable analog filter 403 may include an adaptive filter. The adaptive filter can be dynamically optimized by a microprocessor utilizing an iterative adaptation algorithm. The inputs to the iterative adaptation algorithm can be a downlink reference signal, such as the output signal from the power amplifier 227, and an error signal, such as the output signal from the analog summer 404. The microprocessor can apply the iterative adaptation algorithm to optimize the frequency response of the configurable analog filter 403. The configurable analog filter 403, applying an optimized frequency response, can generate a downlink mitigation signal correlated with the undesirable signal component from the downlink communication path 104. In some aspects, the iterative adaptation algorithm may be a least mean square algorithm.

Although aspects depicted in FIGS. 3-5 have been described with respect to a DAS 10 using digital signals, the systems and processes described above can be implemented using other systems, such as an analog DAS or a repeater system including one or more antennas for transmitting and receiving analog RF signals.

Active Digital Mitigation

Figure 6:
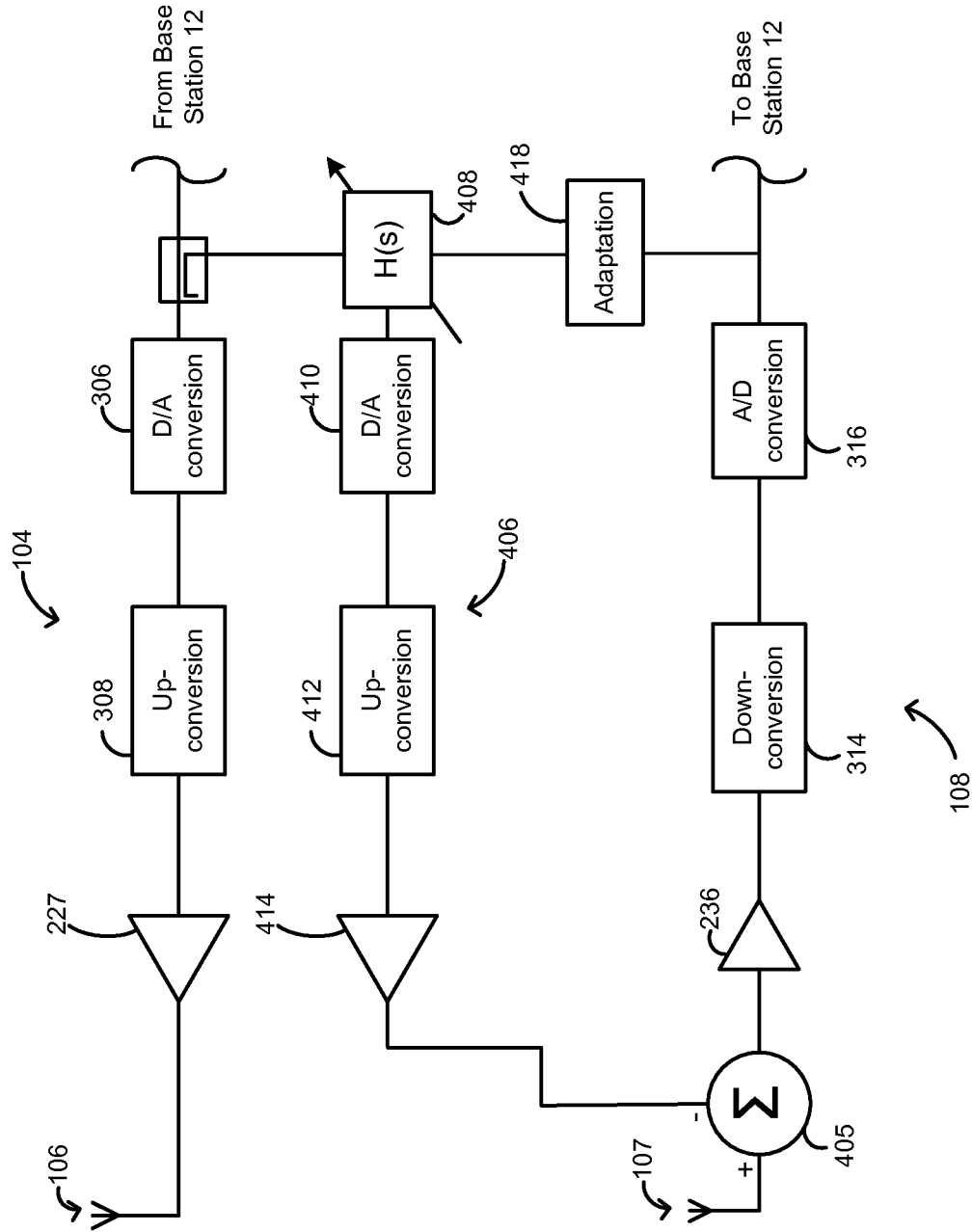
FIG. 6 is a partial schematic view of a non-duplexer isolator sub-system that includes digital analog mitigation according to one aspect.

FIG. 6 schematically depicts a non-duplexer isolator subsystem having active digital mitigation circuitry disposed in uplink communication path 108 and using a sample downlink signal. The active digital mitigation circuitry may include a digital summer 405 that receives a downlink mitigation signal traversing a reference communication path 406. The reference communication path 406 may include a path from a coupled point at the input of the digital-to-analog conversion block 306 to an input of the digital summer 405. The reference communication path 406 may include a configurable digital filter 408, a digital-to-analog conversion block 410, an up-conversion block 412, and an amplifier 414.

A downlink reference signal can traverse the reference communication path 406. The configurable digital filter 408 can generate a downlink mitigation signal from the downlink reference signal by adjusting the gain and shifting the phase of the downlink reference signal. The downlink mitigation signal may be equal in amplitude to and 180 degrees out of phase with undesirable signal components generated in downlink communication path 104 and recovered by receive antenna 107. An example of a configurable digital filter 408 can be a digital least-mean-square adaptive filter.

The digital-to-analog conversion block 410, the up-conversion block 412, and the amplifier 414, can process the downlink reference signal in the same manner as the corresponding components included in a parallel section of the downlink communication path 104 that can process the downlink signal.

The output of the amplifier 414 can be communicatively coupled to one of the inputs of the digital summer 405. Another input of the digital summer 405 can be communicatively coupled to the receive antenna 107. The digital summer 405 can receive the downlink mitigation signal and sum the downlink mitigation signal with the uplink signal to mitigate any undesirable signal components present in the uplink signal. The digital summer 405 can provide the uplink signal to the low noise amplifier 236. The uplink signal can traverse the remainder of uplink communication path 108 as depicted in FIG. 3.

An adaptation algorithm 418 can receive an uplink reference signal sampled from the uplink communication path 108. A microprocessor can execute the adaptation algorithm 418 to iteratively adjust a frequency response of the configurable digital filter 408 based on the uplink reference signal.

Figure 7:
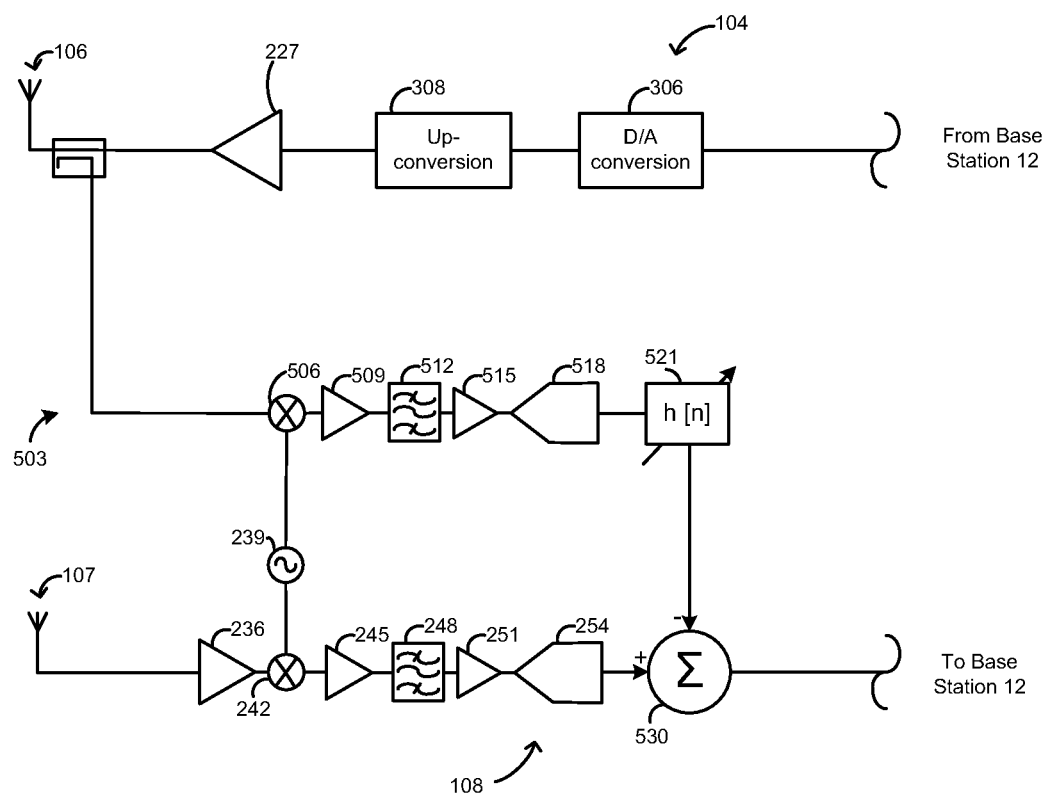
FIG. 7 is a partial schematic view of a non-duplexer isolator sub-system that includes active digital mitigation according to one aspect.

FIG. 7 depicts a non-duplexer isolator sub-system that includes active digital mitigation circuitry. FIG. 7 also depicts the downlink communication path 104, the uplink communication path 108, and a reference communication path 503. The active digital mitigation circuitry may include a digital summer 530 that receives a downlink mitigation signal from a configurable digital filter 521 in a reference communication path 503.

FIG. 7 schematically depicts the components that may be included in the uplink communication path 108 and the corresponding components that may be included in the reference communication path 503 in addition to the configurable digital filter 521. The reference communication path 503 can include a mixer 506 coupled to a local oscillator 239, an amplifier 509, an analog IF filter 512, an amplifier 515, and an analog-to-digital converter 518. FIG. 7 also depicts the downlink communication path 104 using signal processing blocks.

The reference communication path 503 may be a path from the output of the power amplifier 227 to one of the inputs of the digital summer 530. The power amplifier 227 can provide a downlink reference signal to the configurable digital filter 521 via the reference communication path 503. A mixer 506 (communicatively coupled to local oscillator 239), an amplifier 509, an analog IF filter 512, an amplifier 515, and an analog-to-digital converter 518 can process the downlink reference signal in the same manner as the corresponding components included in a parallel section of uplink communication path 108 that can process the uplink signal.

The configurable digital filter 521 can be positioned in the reference communication path 503. The configurable digital filter 521 can receive a downlink reference signal from analog-to-digital converter 518 and generate a downlink mitigation signal. To generate the downlink mitigation signal, the configurable digital filter 521 can adjust the gain and phase of the downlink reference signal. The downlink mitigation signal may be equal in amplitude to and phase shifted 180 degrees from any undesirable signal component generated in downlink communication path 104 and recovered by receive antenna 107.

The digital summer 530 can be positioned in the uplink communication path 108. The output of the configurable digital filter 521 can be communicatively coupled to one of the inputs of the digital summer 530. Another input of the digital summer 530 may be communicatively coupled to the output of the analog-to-digital converter 254.

The digital summer 530 can receive a downlink mitigation signal from configurable digital filter 521 and a digital uplink signal from the analog-to-digital converter 254. The digital summer 530 can sum the downlink mitigation signal with the uplink signal to mitigate any undesirable signal components present in the uplink signal. The digital summer 530 can provide the uplink signal to the digital-to-analog converter 263. The uplink signal can traverse the remainder of uplink communication path 108.

In some aspects, a non-duplexer isolator sub-system may include one or more devices for optimizing the frequency response of a configurable digital filter, as depicted in FIGS. 7 through 10. Optimizing the frequency response can allow the configurable digital filter to dynamically generate an accurate downlink mitigation signal corresponding to an undesirable signal component.

Figure 8:
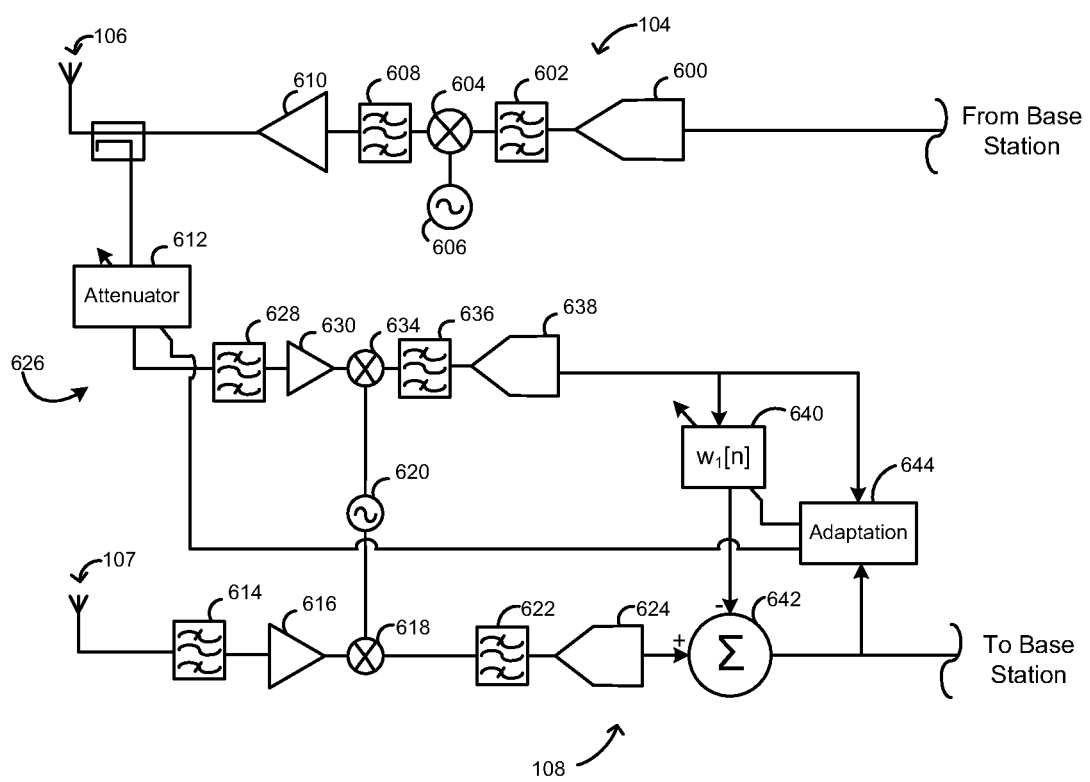
FIG. 8 is a schematic view of the non-duplexer isolator sub-system including an adaptive filter for active digital mitigation according to one aspect.

The aspect depicted in FIG. 8 includes the downlink communication path 104, the uplink communication path 108, a reference communication path 626, the transmit antenna 106, and the receive antenna 107.

The downlink communication path 104 may include a digital-to-analog converter 600, an analog filter 602, a mixer 604, a local oscillator 606, an image reject filter 608, and a power amplifier 610. The digital-to-analog converter 600 can convert digital downlink signals to analog signals. The analog filter 602 can remove any aliases resulting from converting the digital downlink signals to analog signals. The mixer 604 and the local oscillator 606 can up-convert downlink signals to RF. The image reject filter 608 can reject or attenuate any output signal from mixer 604 at an image frequency of the desired downlink frequency. The power amplifier 610 can amplify the downlink signal to an output power for transmission.

The uplink communication path 108 may include an analog filter 614, a low noise amplifier 616, a mixer 618, a local oscillator 620, an anti-aliasing filter 622, an analog-to-digital converter 624, and a digital summer 642. The analog filter 614 can reject or attenuate noise on uplink signals recovered by receive antenna 107. The low noise amplifier 616 can amplify the uplink signal. The mixer 618 and the local oscillator 620 can down-convert the uplink signal to IF. The anti-aliasing filter 622 can reject signal components at frequencies greater than one-half the sampling frequency of the analog-to-digital converter 624, as well as frequencies within one or more adjacent Nyquist zones. Rejecting signal components at frequencies greater than one-half the sampling frequency of the analog-to-digital converter 624 and at frequencies within one or more adjacent Nyquist zones can reduce aliasing from converting the uplink signal from analog to digital. The analog-to-digital converter 624 can convert the analog uplink signal to a digital uplink signal. The digital summer 642 can sum the downlink mitigation signal from the configurable digital filter 640 with the uplink signal from the analog-to-digital converter 624.

The reference communication path 626 may include an attenuator 612, an analog filter 628, a low noise amplifier 630, a mixer 634, an anti-aliasing filter 636, an analog-to-digital converter 638, and a configurable digital filter 640.

As depicted in FIG. 8, the downlink mitigation signal can be generated from a downlink reference signal traversing the reference communication path 626. The attenuator 612 can attenuate the downlink reference signal such that the downlink reference signal power at the input to the analog filter 628 is equal to the power of any undesirable signals recovered by the receive antenna 107 at the input to the analog filter 614. Equalizing the power of the downlink reference signal and the undesirable signals recovered by the receive antenna 107 can ensure that the mitigation signal generated by the configurable digital filter 640 can mitigate non-linear distortion signals on uplink communication path 108.

Non-linear distortion on uplink communication path 108 can be caused by the mixer 618 receiving undesirable signals recovered by the receive antenna 107. Undesirable signals received by the mixer 618 can be processed by the mixer 618. The output of the mixer 618 can include non-linear distortion signal components at intermodulation frequencies. The non-linear distortion signal components at intermodulation frequencies can result from the mixing of undesirable signals and harmonic responses from the local oscillator 620 and the input RF signals to the mixer 618. The output of the mixer 634 can also include non-linear distortion signal components.

The attenuator 612 can attenuate the power of the downlink reference signal such that the ratio between the undesirable signal power and the non-linear distortion signal power for signals traversing the uplink communication path 108 is equal to the ratio between the downlink reference signal power and the non-linear distortion signal power for signals traversing the reference communication path 626. Equalizing these ratios can allow the mitigation signal generated from the reference signal to mitigate both the undesirable signals and the non-linear distortion signal components on the uplink communication path 108. The attenuation provided by the attenuator 612 can be dynamically adjusted by a microprocessor executing the adaptation algorithm 644. The operation of the microprocessor executing the adaptation algorithm 644 is described in further detail below.

The analog filter 628 and the low noise amplifier 630 can perform the same functions as the corresponding components included in the uplink communication path 108. The mixer 634, communicatively coupled to local oscillator 620, can down-convert the downlink reference signal. The anti-aliasing filter 636 can reduce aliasing from converting the downlink reference signal from analog to digital by rejecting signal components at frequencies greater than one-half the sampling frequency of the analog-to-digital converter 638, as well as frequencies within one or more adjacent Nyquist zones. The analog-to-digital converter 638 can convert the analog downlink reference signal to a digital downlink reference signal.

The configurable digital filter 640 can modify the downlink reference signal to generate the downlink mitigation signal as described above with respect to FIG. 7. The downlink mitigation signal can remove undesirable signals generated in the downlink communication path 104 from the uplink signal. The digital summer 642 can sum the downlink mitigation signal with the uplink signal. An output ($e_1(n)$) of digital summer 642 can be the uplink signal after mitigating undesirable signal components.

A microprocessor executing the adaptation algorithm 644 can iteratively adjust a frequency response $w_1[n]$ of the configurable digital filter 640 and the attenuation provided by attenuator 612 in response to $e_1(n)$ and the downlink reference signal. The adaptation algorithm 644 can receive as inputs $e_1(n)$ and the downlink reference signal. Iteratively adjusting the frequency response of the configurable digital filter 640 can allow the configurable digital filter 640 to dynamically generate a downlink mitigation signal in response to the transmission of a downlink signal. Iteratively adjusting the attenuation provided by attenuator 612 can allow attenuator 612 to equalize the signal power of the downlink reference signal and the undesirable signals recovered by the receive antenna 107.

Figure 9:
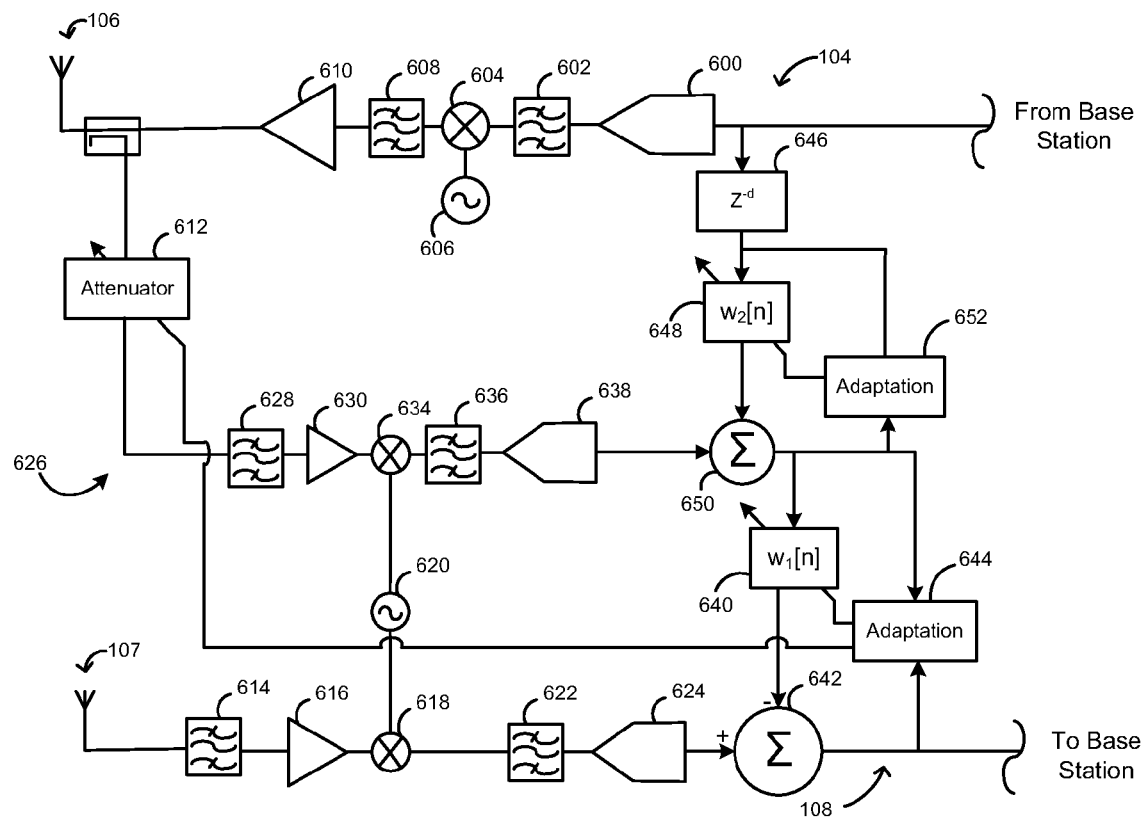
FIG. 9 is a schematic view of the non-duplexer isolator sub-system using active mitigation including circuitry for mitigating uplink frequency components overlapping caused by overlapping uplink and downlink frequency bands according to one aspect.

FIG. 9 depicts the above-described system with additional circuitry to mitigate from the downlink reference signal one or more signal components at frequencies in the uplink frequency band caused by overlapping uplink and downlink frequency bands. The transmit antenna 106 and the receive antenna 107 may use overlapping frequency bands, for example, in a DAS 10 that is configured for time division duplex operation. The transmit antenna 106 and the receive antenna 107 using overlapping frequency bands can cause the downlink reference signal traversing the reference communication path 626 to include signal components at uplink frequencies in addition to undesirable signals. Including signal components at uplink frequencies in the downlink reference signal can cause the mitigation signal generated using the downlink reference signal to mitigate or distort uplink signals in addition to mitigating undesirable signals.

The system depicted in FIG. 9 can remove signal components at uplink signal frequencies from the downlink reference signal to reduce or prevent the mitigation signal from distorting the uplink signal. In FIG. 9, the input to digital-to-analog converter 600 may be used as a second reference signal. A time delay component 646 can time-delay the second reference signal. The delay can be equal to the propagation delay of the downlink reference signal traversing the reference communication path 626. The propagation delay can be equal to the delay introduced by the components of both the downlink communication path 104 and the reference communication path 626. Delaying the second reference signal can ensure that the second reference signal is in phase with the downlink reference signal traversing the reference communication path 626.

The configurable digital filter 648 can modify the second reference signal to generate a reference mitigation signal. The reference mitigation signal can mitigate signal components at uplink frequencies in the downlink reference signal traversing the reference communication path 626.

The digital summer 650 can sum the reference mitigation signal from the configurable digital filter 648 with the downlink reference signal traversing the reference communication path 626. The digital summer 650 can output a modified reference signal ($e_2(n)$) that does not include uplink frequency components and that can be the input signal to the configurable digital filter 640. The configurable digital filter 640 can generate a downlink mitigation signal from modified reference signal $e_2(n)$. The downlink mitigation signal can remove undesirable signal components resulting from the downlink communication path 104, as depicted in FIG. 8, without inadvertently mitigating or distorting signals on the uplink communication path 108.

A microprocessor using adaptation algorithm 652 can iteratively adjust a frequency response ($w_2[n]$) of a configurable digital filter 648 in response to the modified reference signal $e_2(n)$ and the second reference signal. The inputs to adaptation algorithm 652 can be the modified reference signal $e_2(n)$ and the output signal from time delay component 646. Iteratively adjusting frequency response $w_2[n]$ can allow configurable digital filter 648 to dynamically generate a reference mitigation signal that correlates substantially with the uplink frequency components to be mitigated from the downlink reference signal in the reference communication path 626.

Figure 10:
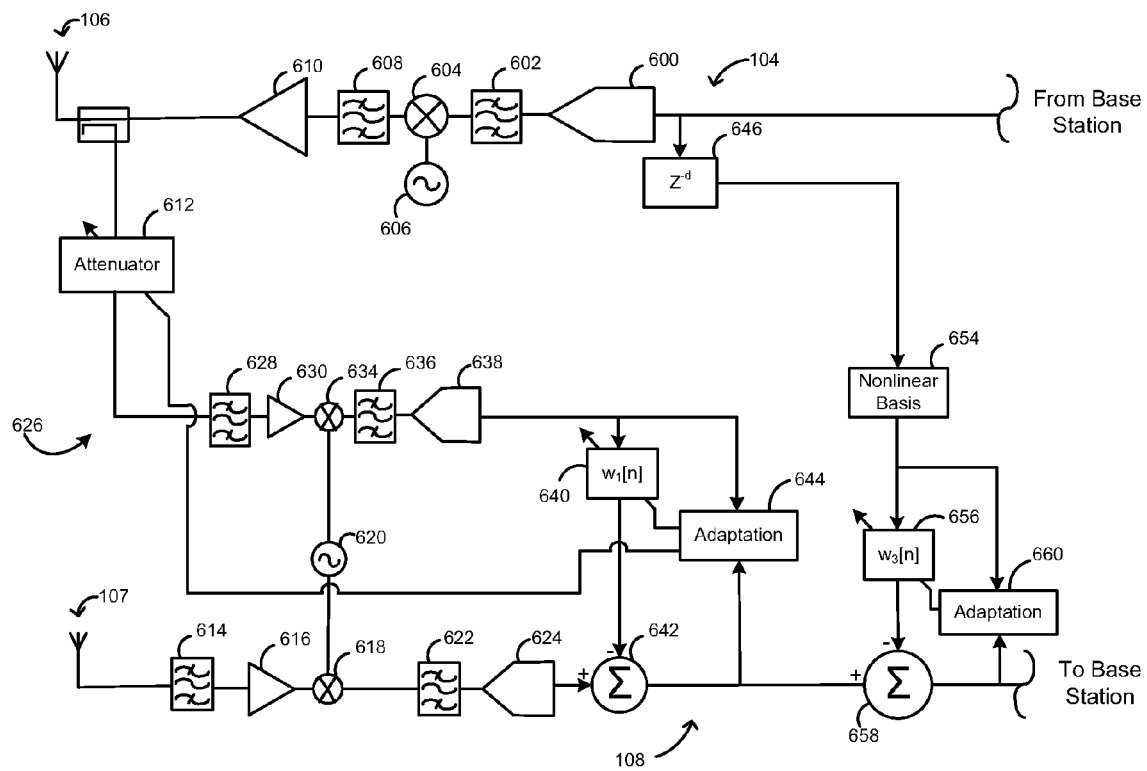
FIG. 10 is a schematic view of the non-duplexer isolator sub-system using active mitigation including circuitry for removing nonlinear distortion from an uplink signal following active digital mitigation according to one aspect.

FIG. 10 depicts additional circuitry to remove additional nonlinear distortion from uplink signals following active digital mitigation. Additional nonlinear distortion can result from downlink noise components generated by downlink analog signal processing components in the downlink communication path 104. The downlink analog signal processing components can include the analog filter 602, the mixer 604, the local oscillator 606, the image reject filter 608, and the power amplifier 610.

Both the uplink signal and the downlink reference signal can include the downlink noise components at the inputs to the frequency conversion circuitry in the uplink communication path 108 and the reference communication path 626. Frequency conversion circuitry can include the analog filters 614, 628, the low noise amplifiers 616, 630, the mixers 618, 634, the local oscillator 620, the anti-aliasing filters 622, 636, and the analog-to-digital converters 624, 638. Frequency conversion circuitry in the respective signal paths can create additional nonlinear distortion signals in the uplink communication path 108 and the reference communication path 626 by processing downlink noise components in each signal path.

The randomized (i.e., non-periodic) nature of the downlink noise components can cause randomized additional nonlinear distortion signals. Phase-shifting the additional nonlinear distortion signal traversing the reference communication path 626 may not create a mitigation signal that can mitigate the additional nonlinear distortion signal traversing the uplink communication path 108. Instead, digital summer 642 may sum the additional nonlinear distortion signals traversing the uplink communication path 108 and the reference communication path 626. The output of digital summer 642 may be an uplink signal that includes the summed additional nonlinear distortion signals.

To remove the summed additional nonlinear distortion signals from the uplink signal, configurable digital filter 656 can generate a nonlinear distortion mitigation signal to mitigate additional nonlinear distortion in the uplink communication path 108. The digital summer 642 and the configurable digital filter 640 can mitigate other undesirable signal components as depicted in FIG. 8.

FIG. 10 depicts components for generating the nonlinear distortion mitigation signal according to one aspect. A second reference signal can be time-delayed in the same or similar manner as in FIG. 9. A non-linear transformation function 654 can generate a distorted reference signal from the output of time delay component 646. The distortion from non-linear transformation function 654 is proportional to the additional nonlinear distortion from the downlink analog signal processing components and the frequency conversion circuitry in the uplink communication path 108 and the reference communication path 626.

The configurable digital filter 656 can generate a nonlinear distortion mitigation signal from the distorted reference signal. The nonlinear distortion mitigation signal can mitigate the summed additional nonlinear distortion signals from the output of digital summer 642 traversing the uplink communication path 108.

The digital summer 658 can sum the nonlinear distortion mitigation signal with the uplink signal. The output of digital summer 658 may be a modified uplink signal ($e_3(n)$).

A microprocessor having a computer readable medium on which an adaptation algorithm 660 is stored can iteratively adjust frequency response $w_3[n]$ of a configurable digital filter 656 in response to $e_3(n)$ and the second reference signal. The inputs to the adaptation algorithm 660 can be modified uplink signal $e_3(n)$ and the output of the non-linear transformation function 654. Iteratively adjusting the frequency response $w_3[n]$ can allow the configurable digital filter 656 to generate dynamically a mitigation signal that correlates substantially with the summed additional nonlinear distortion signals traversing the uplink communication path 108.

Figure 11:
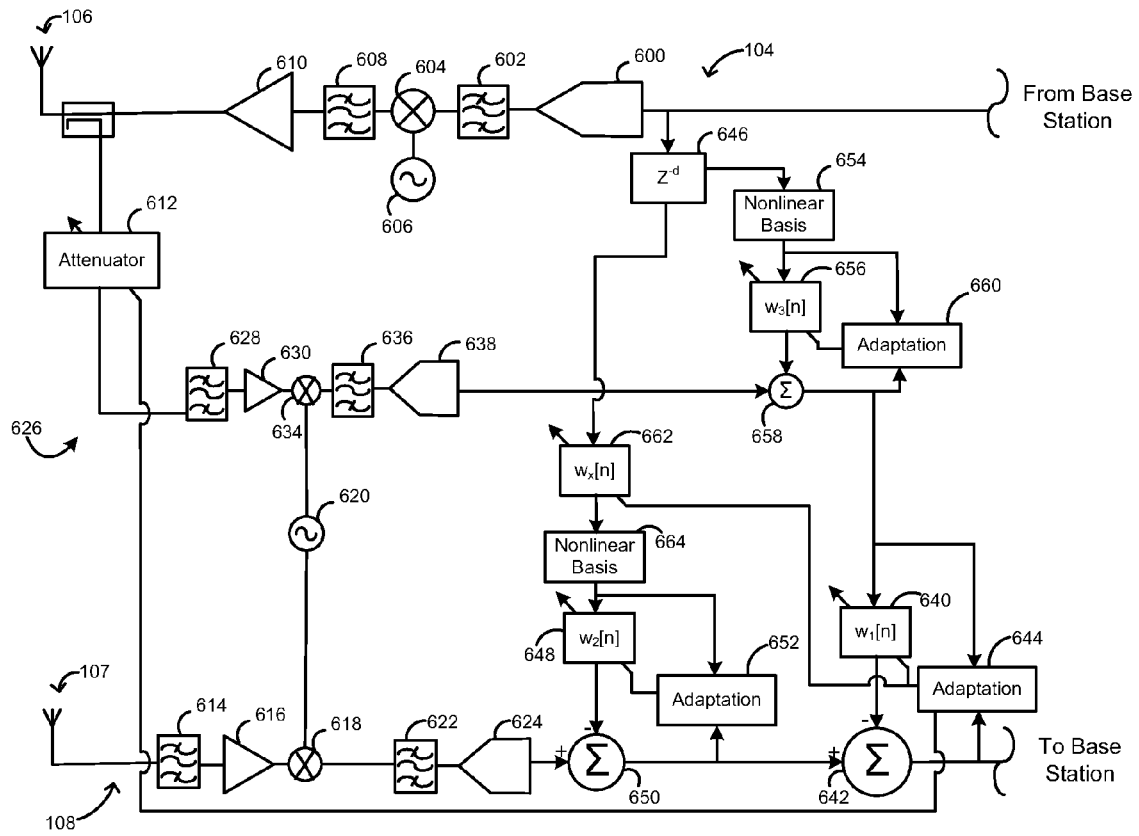
FIG. 11 is a schematic view of the non-duplexer isolator sub-system using active mitigation including circuitry for separately removing nonlinear distortion from the active mitigation signal and the uplink signal prior to active digital mitigation according to one aspect.

FIG. 11 depicts additional circuitry for separately mitigating the additional nonlinear distortion signals traversing the uplink communication path 108 and the reference communication path 626. The configurable digital filter 656 and the digital summer 658 can remove the additional nonlinear distortion signal traversing the reference communication path 626. The configurable digital filter 648 and the digital summer 650 can remove the additional nonlinear distortion signal traversing the uplink communication path 108.

The configurable digital filter 662 can modify the time-delayed reference signal from a time delay component 646. The configurable digital filter 662 can attenuate the time-delayed reference signal such that the power of the time-delayed reference signal is equal to the power of the additional nonlinear distortion signal traversing the uplink communication path 108. The output signal of the configurable digital filter 662 can be the input to non-linear transformation function 664. The output signal of the non-linear transformation function 664 can be the input to the configurable digital filter 662.

The configurable digital filter 648 can generate a distortion mitigation signal proportional to the additional nonlinear distortion signal traversing the uplink communication path 108. The distortion mitigation signal can mitigate the additional nonlinear distortion signal traversing the uplink communication path 108. The digital summer 650 can sum the distortion mitigation signal with the uplink signal to mitigate the additional nonlinear distortion signal traversing the uplink communication path 108. The frequency response of configurable digital filter 648 can be optimized as depicted in FIG. 10.

The configurable digital filter 656 and the digital summer 658 can mitigate the additional nonlinear distortion signal traversing the reference communication path 626. The configurable digital filter 656 can generate a distortion mitigation signal proportional to the additional nonlinear distortion signal traversing the reference communication path 626. The distortion mitigation signal can mitigate the additional nonlinear distortion signal traversing the reference communication path 626. The digital summer 658 can sum the distortion mitigation signal with the downlink reference signal to mitigate the additional nonlinear distortion signal traversing the reference communication path 626. The output of digital summer 658 can be a modified reference signal after mitigating the additional nonlinear distortion signal traversing the reference communication path 626. The frequency response of the configurable digital filter 656 can be optimized as depicted in FIG. 10.

The configurable digital filter 640 can generate a downlink mitigation signal from the modified reference signal. The digital summer 642 can sum the downlink mitigation signal with the uplink signal from digital summer 650. The output of the digital summer 642 can be the uplink signal after mitigating both the undesirable downlink signal components and the additional nonlinear distortion signals traversing the uplink communication path 108 and the reference communication path 626.

Uplink Gain Adjust

Figure 12:
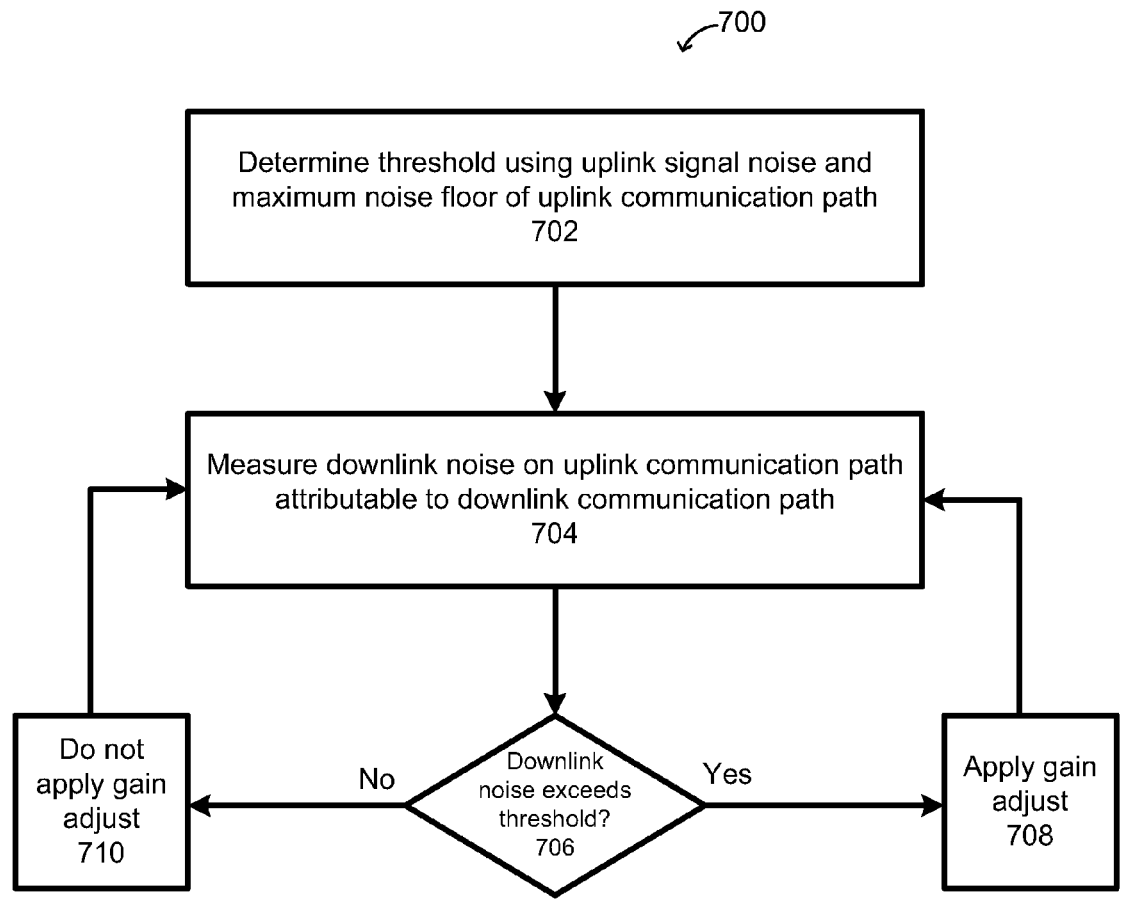
FIG. 12 is a flow chart illustrating a process for configuring an uplink gain adjust device according to one aspect.

FIG. 12 depicts a method 700 for configuring an uplink gain adjust device according to one aspect. The process of FIG. 12 is described with reference to FIG. 3, but other implementations are possible. The uplink gain adjust device 278 can adjust the gain of the uplink signal in response to noise generated by transmit antenna 106. Adjusting the gain of the uplink signal can prevent noise on the uplink communication path 108 from distorting the uplink signal.

In block 702, a threshold is calculated using a maximum noise floor in the uplink communication path 108 and the power of the noise signal in the uplink communication path 108. A noise floor may be the power of the noise signal in the uplink communication path 108 created by all sources of noise. The sources of noise can include noise from the devices in the uplink communication path 108 and any downlink noise component from the downlink communication path 104. The uplink signal can be distorted by the noise floor exceeding the minimum power of an uplink signal. A maximum noise floor can be specified as a noise floor at some value below the minimum uplink signal amplitude. The threshold may be the power of the downlink noise that can cause the noise floor to exceed the maximum noise floor.

The noise floor can be determined in part by the power of the uplink noise. To measure the uplink noise signal power, a test uplink signal can be transmitted from a mobile device and recovered by the receive antenna 107. In some aspects, a noise figure meter can be used to measure the power of the uplink noise signal directly. In other aspects, a spectrum analyzer with appropriate hardware and software can be used to determine the spectral composition of the test uplink signal. The spectrum analyzer can be communicatively coupled to a microprocessor or similar device. The microprocessor can execute a software program to analyze the spectral composition of the test uplink signal and determine the power of the uplink noise signal.

The threshold can be calculated as the difference between the maximum noise floor and the power of the uplink noise signal. A microprocessor or similar device can execute a software program to calculate the threshold. The inputs to the software program can include the power of the uplink noise signal and the maximum noise floor. In some aspects, the microprocessor calculating the threshold can be the same as, or communicatively coupled to, a microprocessor that can determine the power of the uplink noise signal.

In block 704, the downlink noise present on the uplink communication path is determined. In some aspects, the downlink noise can be determined by transmitting a test downlink signal on the downlink communication path 104. The test downlink signal can cause a downlink noise component on the uplink communication path 108. A computing device for determining the downlink noise power can be coupled to the uplink communication path 108 at the output of mixer 272. In other aspects, the downlink noise component can be dynamically determined during operation of DAS 10. For example, a computing device for determining the downlink noise component power as downlink signals are transmitted can be coupled to the downlink communication path 104 at transmit antenna 106.

In some aspects, the downlink noise can be measured directly with a noise figure meter. In other aspects, the downlink noise can be determined using a spectrum analyzer with appropriate hardware and software.

In block 706, the downlink noise is compared to the threshold to determine whether the downlink noise exceeds the threshold. A microprocessor or similar device can execute a software program to compare the threshold and the downlink noise. The software program can receive or access the threshold from memory and can receive or determine the downlink noise. In some aspects, the microprocessor can be communicatively coupled to the computing device for determining the threshold and the computing device for determining the downlink noise.

If the downlink noise exceeds the threshold, the uplink gain adjust device 278 can adjust the uplink gain adjust device in block 708 to amplify the uplink signals sufficiently to increase the minimum uplink signal power above the noise floor. If the downlink noise component does not exceed the threshold, no gain adjust is applied as in block 710. In aspects including a dynamic measurement of the downlink noise in block 704, blocks 704 through 710 can be executed iteratively during operation of DAS 10.

Block 708 can be implemented by uplink gain adjust device 278. In some aspects, the uplink gain adjust device 278 is a variable gain amplifier. A variable gain amplifier can vary a gain in response to a control voltage from a voltage source. In some aspects, the control voltage can be selected by an external controller. An example of an external controller is a computing device, such as a laptop or a server, that is communicatively coupled to uplink gain adjust device 278. In other aspects, the control voltage can be selected by a microprocessor disposed in a master unit.

In other aspects, the control voltage is selected by a single physical step, such as in response to turning a dial. In aspects where the control voltage is selected by a single physical step, the microprocessor of block 706 may display a suggested or needed gain adjust to a technician responsible for configuring uplink gain adjust device 278.

In some aspects, one or more communicatively coupled microprocessors may execute software programs corresponding to blocks 702 through 704. In other aspects, a single microprocessor communicatively coupled to appropriate measurement instrumentation may execute the software programs corresponding to blocks 702 through 704.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A non-duplexer isolator sub-system for a distributed antenna system, the non-duplexer isolator sub-system comprising:
an electronically configurable filter positioned in at least one of:
a downlink path configured for communicatively coupling a transmit antenna of the distributed antenna system to a base station;
an uplink path configured for communicatively coupling a receive antenna of the distributed antenna system to the base station;
wherein the electronically configurable filter is configured for isolating the uplink path from downlink signals traversing the downlink path, wherein the electronically configurable filter is further configured for isolating the uplink path from downlink signals in a first frequency band in response to a first electronic control signal and is configured for isolating the uplink path from downlink signals in a second frequency band in response to a second electronic control signal.

2. The non-duplexer isolator sub-system of claim 1, wherein the electronically configurable filter comprises a bandpass filter and is configurable with a first frequency response corresponding to the first frequency band and a second frequency response corresponding to the second frequency band.

3. The non-duplexer isolator sub-system of claim 1, further comprising a processing device configured to modify a frequency response of the electronically configurable filter in response to an electronic control signal.

4. The non-duplexer isolator sub-system of claim 1, wherein the electronically configurable filter has a frequency response that is electrically tunable in response to an electronic control signal.

5. The non-duplexer isolator sub-system of claim 4, wherein the electronically configurable filter comprises at least one varactor diode, wherein the frequency response of the electronically configurable filter is electrically tunable in response to a voltage applied to the at least one varactor diode.

6. The non-duplexer isolator sub-system of claim 5, wherein the at least one varactor diode has a capacitance that is tunable by the voltage and that corresponds to at least one of a bandwidth and a center frequency of the electronically configurable filter.

7. The non-duplexer isolator sub-system of claim 5, further comprising a voltage source configured to provide the voltage and a processing device communicatively coupled to the voltage source, the processing device configured for selecting a voltage level of the voltage in response to receiving an electronic control signal.

8. The non-duplexer isolator sub-system of claim 1, wherein the electronically configurable filter is disposed in a remote antenna unit of the distributed antenna system.

9. The non-duplexer isolator sub-system of claim 8, wherein the electronically configurable filter is positioned in the downlink path between an up-conversion module of the remote antenna unit and the transmit antenna.

10. The non-duplexer isolator sub-system of claim 9, wherein an input of the electronically configurable filter is communicatively coupled to a power amplifier of the remote antenna unit and an output of the electronically configurable filter is coupleable to the transmit antenna.

11. The non-duplexer isolator sub-system of claim 8, wherein the electronically configurable filter is positioned in the uplink path between a down-conversion module of the remote antenna unit and the receive antenna.

12. The non-duplexer isolator sub-system of claim 11, wherein an input of the electronically configurable filter is communicatively coupled to a low noise amplifier of the remote antenna unit and an output of the electronically configurable filter is communicatively coupled to the down-conversion module.

13. A method for configuring a non-duplexer isolator sub-system of a distributed antenna system, the method comprising:
   providing the non-duplexer isolator sub-system in at least one of a downlink path of the distributed antenna system and an uplink path of the distributed antenna system;
   providing a first electronic control signal to the non-duplexer isolator sub-system;
   configuring, in response to the first electronic control signal, an electronically configurable filter of the non-duplexer isolator sub-system to isolate the uplink path from downlink signals in a first frequency band traversing the downlink path;
   providing a second electronic control signal to the non-duplexer isolator sub-system; and
   configuring, in response to the second electronic control signal, the electronically configurable filter to isolate the uplink path from downlink signals in a second frequency band traversing the downlink path.

14. The method of claim 13, wherein the electronically configurable filter comprises a bandpass filter, wherein configuring the electronically configurable filter to isolate the uplink path from the downlink signals in the first frequency band comprises selecting a first frequency response for the bandpass filter, wherein configuring the electronically configurable filter to isolate the uplink path from the downlink signals in the second frequency band comprises selecting a second frequency response for the bandpass filter.

15. The method of claim 14, wherein the bandpass filter comprises at least one electrically tunable component, wherein selecting the first frequency response for the bandpass filter comprises applying a first voltage tuning the at least one electrically tunable component to a first capacitance corresponding to the first frequency response, wherein selecting the second frequency response for the bandpass filter comprises applying a second voltage tuning the at least one electrically tunable component to a second capacitance corresponding to the second frequency response.

16. The method of claim 15, wherein the at least one electrically tunable component comprises at least one varactor diode.

17. The method of claim 15, wherein applying the first voltage comprises selecting a first voltage level for a voltage source in the non-duplexer isolator sub-system and wherein applying the second voltage comprises selecting a second voltage level for the voltage source.

18. The method of claim 17, wherein the first and second voltage levels are selected by a processing device of the non-duplexer isolator sub-system in response to respectively receiving the first and second electronic control signals.

19. The method of claim 13, further comprising communicatively coupling an external computing device to the distributed antenna system, wherein the first and second electronic control signals are provided from the external computing device.

* * * * *